May 22, 1923. 1,455,943
G. R. WALKER
DRIVING WHEEL FOR MOTOR VEHICLES AND THE LIKE
Filed Nov. 15, 1919

Inventor
George R. Walker
By Brown Boettcher and
Dennis Attorneys

Patented May 22, 1923.

1,455,943

UNITED STATES PATENT OFFICE.

GEORGE R. WALKER, OF CLARENDEN HILLS, ILLINOIS, ASSIGNOR, BY MESNE ASSIGNMENTS, TO WALKER VEHICLE COMPANY, OF CHICAGO, ILLINOIS, A CORPORATION OF ILLINOIS.

DRIVING WHEEL FOR MOTOR VEHICLES AND THE LIKE.

Application filed November 15, 1919. Serial No. 338,229.

*To all whom it may concern:*

Be it known that I, GEORGE R. WALKER, a citizen of the United States, residing at Clarenden Hills, in the county of Du Page and State of Illinois, have invented a certain new and useful Improvement in Driving Wheels for Motor Vehicles and the like, of which the following is a full, clear, concise, and exact description, reference being had to the accompanying drawings, forming a part of this specification.

My invention relates to driving wheels for motor vehicles and the like and more particularly to driving or traction wheels of the internal gear type.

Heretofore in the art in wheels of this general description it has been customary to mount the internal ring or drive gear between the side or casing plates or disks of the wheel, or to otherwise clamp this gear in place through one or both of these side plates, so that upon removing either of the side plates to secure access to the driving mechanism within the wheel the means for mounting or clamping the internal drive gear in place has been released, and the gear consequently subject to displacement. I propose to overcome this difficulty by providing means whereby upon removal of the side plates of the wheel the mounting of the internal drive gear is in no way affected, this gear being effectively maintained in place independently of the side plates at such time.

Among the salient features of my invention are the provision of a wheel of the above general description wherein the gear mechanism contained within the wheel is entirely housed against the entrance of dirt, dust and other foreign matter; the provision of an extremely simple construction both as to manufacture and assembly; the provision of a high order of compactness; the provision whereby access to the driving mechanism within the wheel may be readily had by removing the side plates or casings thereof without removing the entire wheel from the axle, and whereby upon such removal of the side plates or casings of the wheel the mounting of the internal ring or drive gear is in no way affected, this gear being effectively maintained in place independently of the side plates or casings of the wheel at such time and the provision whereby this ring or drive gear may be quickly and in a simple manner removed should any occasion for such removal arise.

Other features and advantages will be apparent from the following detailed description and the accompanying drawings, in which I have described and illustrated the preferred embodiment of my invention.

Figures 1, 2, 3:
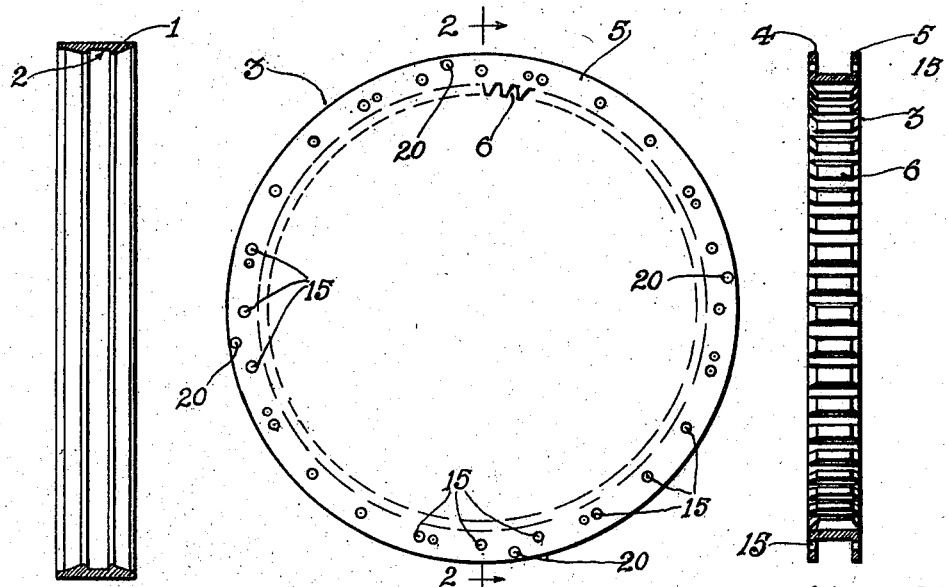
Figure 1 is a diametrical cross section of the rim or wheel band.
Figure 2 is a diametrical cross section of the internal drive gear taken substantially on the line 2—2 of Figure 3.
Figure 3 is a side elevational view of the same.

Referring to the drawings, the rim or wheel band 1 is provided with an internal annular groove 2. The internal drive gear 3 has a channeled periphery provided by the annular flanges 4 and 5 projecting radially outwardly from the opposite sides thereof. Otherwise the gear 3 is of the usual construction, having teeth 6 projecting from the internal surface thereof.

A series of locating springs or resilient keys 7 (Figures 4 and 5) are arranged circumferentially through the channeled periphery of the internal gear 3 for aligning and maintaining the gear 3 in place upon arranging the same within the rim or wheel band 1. The springs 7 are mounted at one end upon pins 8, which pins 8 extend transversely between the radial flanges 4 and 5 of the gear 3 and are mounted at their opposite ends in these flanges. The free end of each of the springs 7 is held between the annular rim portion or bottom wall of the channeled periphery of the gear 3 and a pin 9 extending transversely between the radial flanges 4 and 5 mounted at its opposite ends therein. Upon springing the free end of the spring 7 between the rim portion of the gear 3 and the pin 9, the offset portion 10 of this spring is sprung beyond the peripheries of the annular flanges 4 and 5 of the internal gear 3. The offset portions 10 of the springs 7 are provided with depressions 11, the purpose of which depressions will be hereinafter pointed out.

Figures 4, 5:
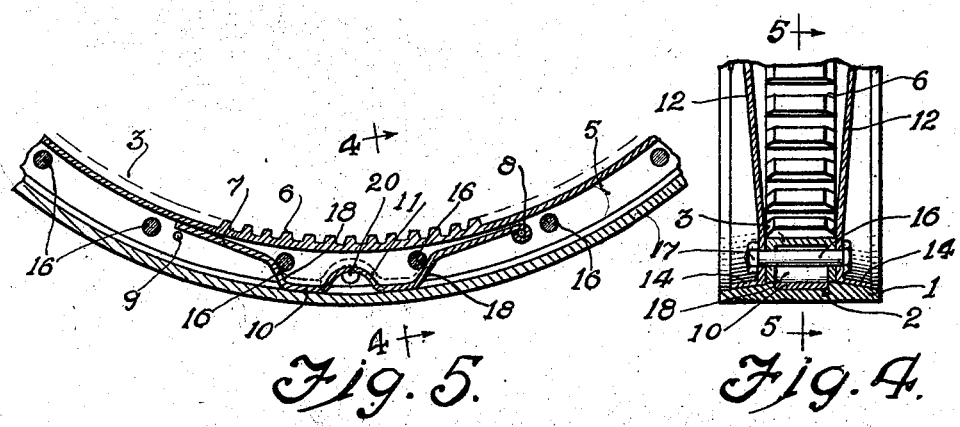
Figure 4 is a fragmentary diametrical section taken substantially on the line 4—4 of Figure 5 showing the parts assembled.
Figure 5 is a fragmentary circumferential section taken substantially on the line 5—5 of Figure 4.
Figure 6:
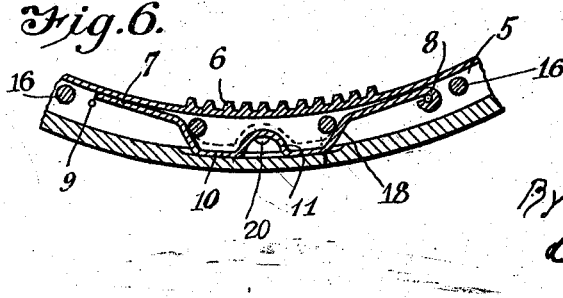
Figure 6 is a view similar to Figure 5 of a modification.

The internal surface of the rim or wheel band 1 is inclined or tapered from the opposite sides thereof to the annular internal groove 2, as clearly shown in Figures 1 and 4. The side plates or casing disks 12—12 of the wheel are provided with outwardly flared peripheral flanges 14, the outward flare of which flanges is substantially the same as the inclination or taper of the internal surface of the rim or wheel band 1. The inner one of the plates or disks 12 is provided with a suitable opening through which the driving axle of the vehicle extends and is suitably geared through the internal driving gear 3 to the rim of the wheel. The other plate or disk 12 may be provided with a hub-like portion or an opening to allow for the extension of cooperating hub therethrough; such structural details as these are dependent upon the particular type of drive in point and immaterial in so far as the present invention is concerned.

In assembling the wheel the springs 7 are mounted within the channeled periphery of the driving gear 3 by means of the transverse pins 8. The free ends of these springs are then sprung between the annular rim portion or bottom wall of the channeled periphery of the gear 3 and the transverse pins 9, whereupon the gear 3 is inserted into the rim or wheel band 1. The springs 7 being depressed upon such insertion will obviously, upon alignment of the channeled periphery of the gear 3 with the internal annular groove 2 of the rim or wheel band 1, spring outwardly into this groove 2 securely locking the gear 3 in place against axial displacement. The side plates or casing disks 12—12 are then arranged within the rim 1 on each side of the driving gear 3, the outwardly flared flanges 14 of these plates cooperating with the inclined or tapered internal surfaces of the rim.

The plates 12 are provided with suitable apertures annularly thereabout, which apertures are thereupon aligned with the apertures 15 provided through the radial flanges 4 and 5 of the gear 3. Suitable bolts 16 are then inserted through these aligned apertures and engage in suitable nuts 17, whereupon the outwardly flared flanges of the plates 12—12 are wedged into cooperation with the inclined or tapered internal surfaces of the rim 1 and the plates 12—12 and gear 3 are thereby securely clamped in place. The shanks of certain of the bolts 16 co-operate, as shown in Figure 5, with the inclined surfaces 18 of the springs 7 to brace these springs in their projected positions.

Upon desiring access to the driving mechanism housed within the wheel the nuts 17 are removed from the bolts 16 and either one of the plates 12 removed or the bolts 16 are withdrawn and both of these plates removed as desired. Upon such removal of the bolts 16 the driving gear 3 is effectively maintained against displacement by the cooperation of the projected offset portions 10 of the springs 7 with the internal annular groove 2 provided within the rim or wheel band 1. Should removal of the driving gear 3 be desired, a tapered pin is driven through the apertures 20 provided through the flanges 4 and 5 of the gear 3 and into cooperation with the depressed portions 11 of the offset portions 10 of the springs 7, the apertures 20 being arranged about the flanges 4 and 5 in alignment with these depressed portions of the springs 7, as shown in Figure 5.

Upon being driven into the aperture 20, this tapered pin, by reason of its co-operation with the outer surface of the spring 7 retracts this spring from its projected position into position within the peripheries of the flanges 4 and 5, whereupon the gear 3 may be readily removed.

Obviously, instead of the continuous internal annular groove 2, the rim or wheel band 1 might be provided with a series of discontinuous internal grooves spaced therewithin substantially as the offset portions 10 of the springs 7 project in spaced relation from the annular flanges 4 and 5 of the gear 3. Upon insertion of the gear 3 into the rim the gear or rim could be rotated until these grooves aligned with the offset portions 10 of the springs 7, whereupon these offset portions would be sprung into the grooves of the rim. Such an arrangement would not only prevent axial displacement of the gear 3 upon removal of the disk bolts 16, but would at the same time prevent relative circumferential displacement of the gear 3 and rim 1.

While I have described my invention in connection with the details of a particular embodiment, I do not intend thereby to limit the invention to such details, as I am aware and contemplate that modifications and changes may be made without departing from the invention which is set out in the appended claims.

I claim:

1. In combination, a wheel band, an internal gear adapted to be fitted therewithin, the wheel band and the gear having registering recesses on their facing surfaces, and key means yieldably held lying partly within each recess to secure said gear and said rim against relative displacement.

2. In combination, a wheel band, an internal gear fitted therein, said band and said gear having peripheral grooves facing each other, and yielding means between said gear and said rim and lying partly in each groove for securing said gear and said rim against relative displacement.

3. In combination, a wheel band having an internal groove therein, an internal gear adapted to be fitted within said rim, yielding means carried by said internal gear and normally projecting from the periphery thereof, said yielding means being sprung into said internal groove upon fitting said gear into said rim to secure said gear and said rim against relative displacement.

4. In combination, an internal gear having a channeled periphery, a wheel band having an internal groove for co-operation with the channeled periphery of said internal gear and resilient key means co-operating with said channeled periphery and said internal groove for securing said rim and said gear against relative axial displacement.

5. In combination, a rim having an internal groove therein, an internal gear having a channeled periphery, spring means mounted in said channeled periphery and normally projecting therefrom, said spring means co-operating with the internal groove in said rim upon fitting said internal gear into said rim, whereby relative displacement of said gear and said rim is prevented, and an opening communicating with the channeled periphery of said internal gear through which said spring means may be retracted from engagement with said internal groove.

6. In combination, a wheel band having an internal gear therein, the internal surface of said rim being tapered or inclined from the opposite sides thereof toward said internal gear, a pair of side plates or casing disks, having outwardly flared flanges for co-operation with said inclined surfaces, means for clamping said internal gear and side plates together, said means wedging the outwardly flared flanges of said side plates into engagement with the inclined or tapered inner surfaces of said rim.

7. In combination a wheel band having an internal gear fitted therein, the internal surface of said rim being tapered or inclined toward said internal gear, a side plate or casing disk having a flared flange for cooperation with the inclined internal surface of said rim, means for wedging said flared flange into engagement with said inclined or tapered surface, and yielding means for securing said internal gear within said rim independently of said side plate.

8. In combination, a wheel band, an internal gear fitted within said wheel band or rim, a side plate fitted within said wheel band or rim, and yielding means for securing said internal gear within said rim independently of said side plate.

9. In combination, a wheel band having its internal surface tapered or inclined from the opposite sides toward the center, a pair of side plates having outwardly flared flanges for co-operation with said inclined surfaces, and means for wedging the outwardly flared flanges of said side plates into engagement with said inclined or tapered surfaces to form a chamber within said rim.

10. In combination, a first circular member, a second circular member adapted to embrace the first circular member, said members having cooperating recesses on their facing surfaces, a resilient key adapted to lie partly within each recess for preventing displacement of the members, said resilient key being adapted to be forced wholly within the recess of one member for separating the members, and means lying within one member for normally holding the resilient key partly in the recess of the other member.

In witness whereof I hereunto subscribe my name this 13th day of November, A. D. 1919.

GEORGE R. WALKER.